US009898040B2

(12) United States Patent
Sikdar

(10) Patent No.: US 9,898,040 B2
(45) Date of Patent: Feb. 20, 2018

(54) CONFIGURABLE DOCK STORAGE

(71) Applicant: Kodiak Data, Inc., Los Altos, CA (US)

(72) Inventor: Som Sikdar, Los Altos, CA (US)

(73) Assignee: KODIAK DATA, INC., Los Altos, CA (US)

( * ) Notice: Subject to any disclaimer, the term of this patent is extended or adjusted under 35 U.S.C. 154(b) by 358 days.

(21) Appl. No.: 14/533,214

(22) Filed: Nov. 5, 2014

(65) Prior Publication Data
US 2016/0124462 A1 May 5, 2016

(51) Int. Cl.
*G06F 3/06* (2006.01)
*G06F 1/16* (2006.01)

(52) U.S. Cl.
CPC .......... *G06F 1/1632* (2013.01); *G06F 3/0605* (2013.01); *G06F 3/067* (2013.01); *G06F 3/0631* (2013.01); *G06F 3/0685* (2013.01)

(58) Field of Classification Search
None
See application file for complete search history.

(56) References Cited

U.S. PATENT DOCUMENTS

| | | | |
|---|---|---|---|
| 6,343,346 B1 | 1/2002 | Olnowich | |
| 8,239,584 B1 | 8/2012 | Rabe | |
| 8,296,434 B1 | 10/2012 | Miller | |
| 9,239,786 B2 * | 1/2016 | Ki | ......... G06F 12/0684 |
| 2002/0129216 A1 | 9/2002 | Collins | |
| 2006/0075198 A1 | 4/2006 | Susaki | |
| 2006/0212719 A1 | 9/2006 | Miyawaki | |
| 2009/0249013 A1 | 10/2009 | Daud | |
| 2009/0288084 A1 | 11/2009 | Astete | |
| 2011/0225121 A1 | 9/2011 | Cooper | |
| 2013/0073702 A1 | 3/2013 | Umbehocker | |
| 2016/0259586 A1 * | 9/2016 | Tylik | ...................... G06F 3/0631 |

FOREIGN PATENT DOCUMENTS

EP  1717688 A1  11/2006
WO  2013/188382 A2  12/2013

* cited by examiner

*Primary Examiner* — Cheng-Yuan Tseng
(74) *Attorney, Agent, or Firm* — Schwabe, Williamson & Wyatt

(57) ABSTRACT

A docking scheme enables storage systems to adapt different storage configurations to different clients. Dock configurations identify reconfigurable sets of storage extensions for executing storage operations in a resource node. The resource node receives storage requests from clients and identifies the dock configurations associated with the clients. The resource node then generates a set of storage operations that implement the storage extensions for the identified dock configuration and uses the storage operations to execute the storage requests. Different clients may thus access the same stored data through different docks resulting on different operations within the resource node with the aim of optimizing performance for all clients.

21 Claims, 13 Drawing Sheets

CLIENT 102
STORAGE PROFILE 130

| DATA USE TYPE | TRANSACTIONAL |
|---|---|
| STORAGE OPERATION MIX | READ/WRITE |
| STORAGE ADDRESSING TYPE: | RANDOM |
| DATA OPERATION SIZE | SMALL |

DOCK CONFIGURATION 110

| DOCKING ADDRESS 134 | |
|---|---|
| CACHING | READ AND WRITE |
| READ AHEAD | DISABLED |
| TIERING | READ AND WRITE |
| REDUNDANCY | RAID6 |
| DISTRIBUTION | LOCAL |
| QOS | 2 MSEC |

CONFIGURABLE DOCK STORAGE

BACKGROUND

A block storage system uses protocols, such as small computer system interface (SCSI) and advanced technology attachment (ATA), to access blocks of data. The block storage system may use caching and/or tiering to more efficiently access the blocks of data. The block storage system also may use a virtual addressing scheme for provisioning, duplication, de-duplication, compression, caching, tiering, and/or providing resiliency of data stored on different physical media. Virtual addressing allows the user of the storage system to access blocks of data on the storage system while allowing the storage system to select media count and types, access methods, redundancy and management features without the users' knowledge.

A file storage system manages the data blocks and metadata associated with different files. Files can have variable sizes and may include metadata identifying the associated data blocks. A user of a file storage system may access files whereas the metadata is typically managed by and only accessed by the file storage system. The file storage system may de-duplicate, compress, cache, tier and/or create snapshots of the file data. An object storage system uses handles to put or get objects from object storage. Object storage systems can perform timeouts, scrubbing, caching and/or checkpoints on the stored objects. The file storage system may operate on top of the block storage system and the object storage system either may operate on top of the block storage system or operate on top of the file storage system. A user of an object storage system may access objects whereas the underlying block or file storage is typically managed by and only accessed by the block or file storage system.

Clients may access data differently and thus have different storage requirements. For example, a first user may perform transactional operations that read and write data into random storage locations. A second user may perform analytic operations that primarily read large blocks of sequential data. In such a case, the performance of the first user may be limited by the number of random operations of the storage system while the performance of the second user may be limited by the bandwidth capability of the storage system.

For example, the first user may need to recover data after a hardware or software failure. The storage administrator may configure a redundancy storage extension for the storage system, such as redundant array of independent disks (RAID) that strips the same data on multiple different disks.

The second analytic user may not need data redundancy. However, the redundancy storage extension is used throughout the storage system regardless of which user accesses the disks. Overall storage capacity is unnecessarily reduced since redundant backup data is stored for all users.

The storage administrator also may configure a caching or tiering policy that uses random access memory (RAM) and/or Flash memory to increase access rates for the random read and write operations performed by the first user. The caching or tiering policy is commonly applied to the entire storage system for all storage accesses by all users and minimally to all users of the particular storage data. As an example, if a block storage system enables caching for a particular disk (virtual or physical), said caching is enabled and functions equivalently for all clients accessing said storage data.

The caching or tiering policy may increase data access speeds for the first user but may provide little improvement for the large sequential read operations performed by the second user. Applying the caching or tiering policy to all storage operations may actually reduce storage performance. For example, data from large sequential read operations performed by the second user may flush data from RAM or Flash memory currently being cached or tiered for the first user.

BRIEF DESCRIPTION OF THE DRAWINGS

FIG. 2 depicts an example storage profile and dock configuration.

DETAILED DESCRIPTION

A docking scheme enables storage systems to adapt different storage configurations to different clients. Dock configurations identify reconfigurable sets of storage extensions for executing storage operations in a resource node. The resource node receives storage requests from clients and identifies the dock configurations associated with the clients. The resource node then generates a set of storage operations that implement the storage extensions for the identified dock configuration and uses the storage operations to execute the storage requests. Different clients may thus access the same stored data through different docks resulting on different operations within the resource node with the aim of optimizing performance for all clients.

The resource node uses the dock configurations to customize storage operations for different client storage profiles. The different dock configurations enable the resource node to use different types of storage media more efficiently, such as random access memory, Flash memory, local disk memory, and remote disk memory. The dock configuration may specify the storage media directly or specify a performance target resulting in the resource node monitoring performance and redistributing stored data to different storage media to reach the performance target.

Storage operations can also be synchronized between different resource nodes. The synchronized resource nodes can dynamically reconfigure storage operations without shutting down storage media or disconnecting clients from the storage media. The multiple resource nodes also increase overall adaptability of the storage media to a wider variety of client storage profiles. For example, resource nodes may synchronize write operations to assure that multiple redundant copies of data are stored on physically separated resource nodes or storage media.

In another example, resource nodes may synchronize selected write operations to subsets of data being synchronously mirrored. The resource nodes may determine whether synchronization is required on a per-storage-operation basis through the dock configuration and the resource nodes information regarding others clients on other resource nodes.

For the description below, the term storage extension is used to describe features and capabilities of storage systems beyond simple access methods such as reading and writing. These features and capabilities include caching, tiering, read-ahead, redundancy, utilization of multiple media resources, quality of service levels, or any other features or capabilities provided by the storage system.

Figure 1:
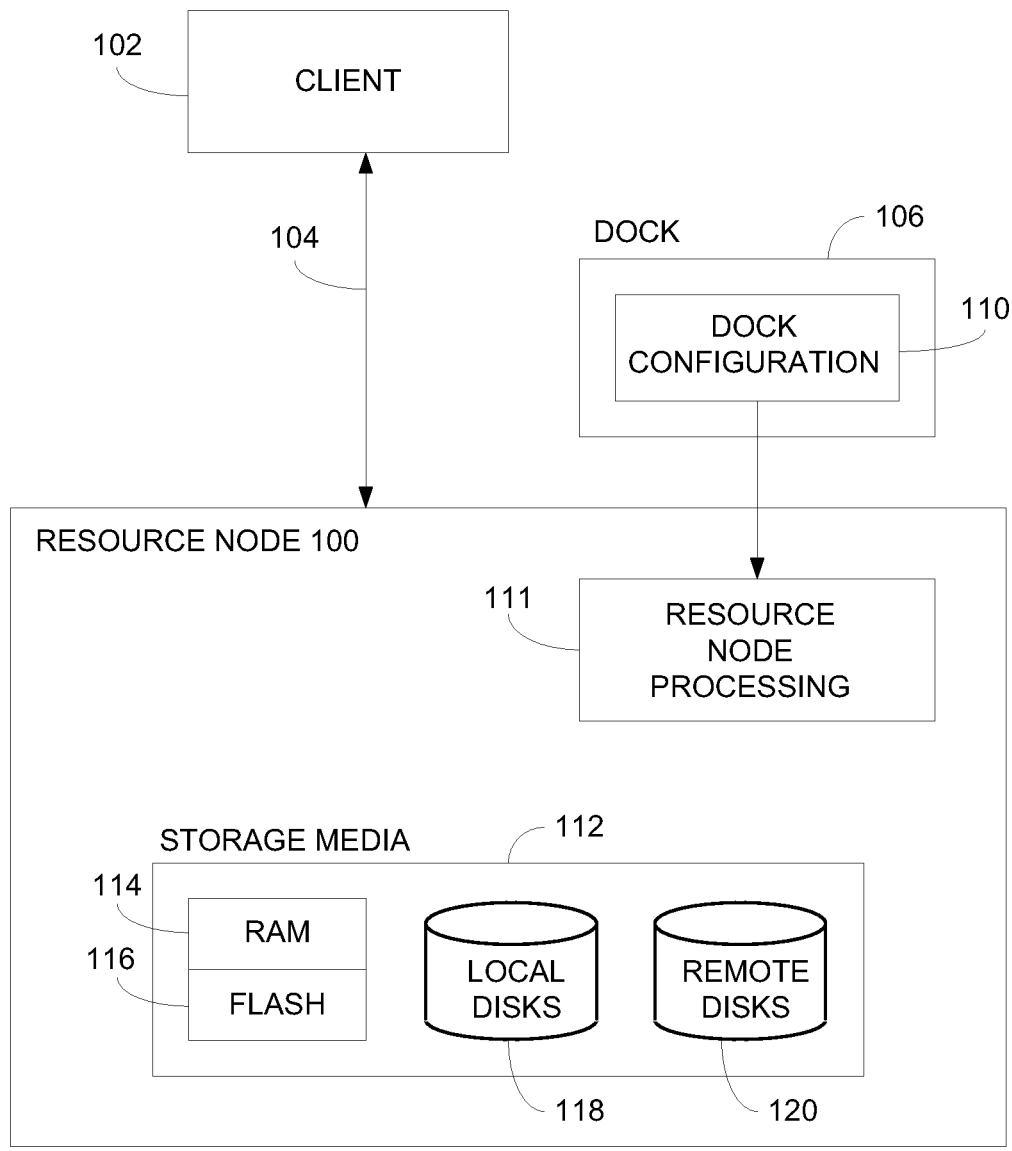
FIG. 1 depicts an example resource node.

FIG. 1 shows a client 102 connected to a resource node 100. Client 102 may comprise any device or application that writes and/or reads data to and from another device. For example, client 102 may comprise one or more servers, server applications, database applications, routers, switches, client computers, personal computers (PCs), Personal Digital Assistants (PDA), smart phones, digital tablets, digital notebooks, or any other wired or wireless computing device and/or software that accesses data.

In another example, client 102 may comprise a standalone appliance, device, or blade. In another example, client 102 may be a processor or software application in a personal computer or server that accesses resource node 100 over an internal or external data bus. In yet another example, client 102 may comprise gateways or proxy devices providing access to storage system 100 for one or more stand-alone appliances, devices or electronic entities.

Resource node 100 may operate on a processing system, such as a storage server, personal computer, etc. Resource node 100 may operate with other resource nodes on the same storage server or may operate with other resource nodes 100 operating on other storage servers.

Storage media 112 may comprise any device that stores data accessed by another device, application, software, client, or the like, or any combination thereof. For example, storage media 112 may comprise one or more solid state device (SSD) chips or dies that contain one or more random access memories (RAMs) 114 and/or Flash memories 116.

Storage media 112 also may include local storage disks 118 and/or remote storage disks 120. Disks 118 and 120 may comprise rotating disk devices, integrated memory devices, or the like, or any combination thereof. Remote disks 120 also may include cloud storage.

Resource node 100 may exist locally within the same physical enclosure as client 102 or may exist externally in a chassis connected to client 102. Client 102 and the computing device operating resource node 100 may be directly connected together, or connected to each other through a network or fabric. In one example, client 102 and resource node 100 are coupled to each other via wired or wireless connections 104.

Different communication protocols can be used over connection 104 between client 102 and resource node 100. Example protocols may include Fibre Channel Protocol (FCP), Small Computer System Interface (SCSI), Advanced Technology Attachment (ATA) and encapsulated protocols such as Fibre Channel over Ethernet (FCoE), Internet Small Computer System Interface (ISCSI), Fibre Channel over Internet Protocol (FCIP), ATA over Ethernet (AoE), Internet protocols, Ethernet protocols, or the like, or any combination thereof. Protocols used between client 102 and resource node 100 also may include tunneled or encapsulated protocols to allow communication over multiple physical interfaces such as wired and wireless interfaces.

A dock 106 comprises any portal with memory for storing one or more dock configurations 110. In one example, dock configuration 110 is an extensible markup language (XML) file that defines a set of storage extensions that determine how resource node 100 appears to client 102, or any other clients, that dock to resource node 100.

A storage administrator may create a file in dock 106 containing dock configuration 110. For example, the storage administrator may create a dock configuration 110 with a set of storage extensions optimized for analytic clients. The storage administrator directs resource node 100 to load dock configuration 110.

Resource node 100 is effectively docked as specified in dock configuration 110. For example, loading dock configuration 110 may cause resource node 100 to open an IP address on an ISCSI port for receiving ISCSI commands. Resource node 100 then uses dock configuration 110 for any client 102 using the specified IP address. For example, client 102 may connect to resource node 100 via an Internet protocol (IP) address or port address that is associated with dock configuration 110. Resource node processing 111 identifies client 102 as docked and performs storage operations that implement the storage extensions identified in dock configuration 110.

In another example, dock configuration 110 may not specify a specific IP address or port for dock configuration 110. Resource node 100 then may apply dock configuration 110 for all clients 102 regardless of which IP addresses are used for accessing resource node 100. The address and port identifiers used in dock configuration 110 may vary depending on the protocol used for connecting client 102 to resource node 100.

Dock configuration 110 provides client based access to storage media 112 verses conventional storage systems that are configured with a set of storage extensions independently the clients accessing storage media 112. Resource node 100 more efficiently and more effectively accesses storage media 112 by implementing storage operations with RAM 114, Flash 116, local disks 118, and remote disks 120 based on the dock configuration 110 associated with client 102. Thus, resource node 100 may provide different storage extensions based on the dock configuration 110 associated with client 102.

FIG. 2 depicts an example storage profile 130 for client 102 previously described above in FIG. 1. Referring to FIGS. 1 and 2, client 102 may generally conduct transactional storage operations. For example, client 102 may comprise a web application used by consumers for purchasing products or services over the Internet.

Characteristics of transactional data usage may include a relatively random combination of read and write operations. Transactional client 102 may generally access random storage locations within storage media 112. Transactional client 102 also may perform storage operations on relatively small amounts of data.

A storage administrator may create dock configuration 110 to accommodate transactional storage profile 130 for client 102. Dock configuration 110 may include a docking address 134 or some other docking identifier. Client 102 may use docking address 134 to access resource node 100. For example, client 102 may dock to resource node 100 using docking address 134. Resource node 100 then may perform storage operations for client 102 based on dock configuration 110.

Dock configuration 110 identifies a variety of different storage extensions 136. The storage administrator may enable or disable storage extensions 136A-136E based on client storage profile 130. For example, a caching storage extension 136A may enable resource node 100 to cache data for read and/or write operations from client 102 in RAM 114.

Storage profile 130 indicates a relatively even mix of small random read and write operations. The storage administrator may enable storage extension 136A in dock configuration 110 to reduce the access time for read and write operations from client 102.

Dock configuration 110 also may include a read ahead storage extension 136B. A storage system may perform read ahead operations for clients that access relatively large sequential blocks of data. Storage extension 136B allows resource node 100 to anticipate large data reads by reading additional blocks of data into RAM 114 and/or Flash 116 beyond the block of data currently addressed by client 102. Resource node 100 can then perform a subsequent sequential reads from faster RAM 114 and/or Flash 116.

Storage profile 130 indicates client 102 reads relatively small blocks of data from relatively random address locations. Client 102 may seldom need to read sequential blocks of data from RAM 114 and/or Flash 116. Thus, the storage administrator may disable read ahead storage extension 136B and preserve RAM 114 and/or Flash 116 for other caching and/or tiering operations.

Based on storage profile 130, the storage administrator may enable tiering storage extension 136C. For example, storage profile 130 may indicate high storage performance. A tiering system (not shown) in resource node 100 may load different data into RAM 114 and/or Flash 116 based on monitored storage patterns. For example, Resource node processing 111 may store different data from disks 118 and/or 120 into RAM 114 and/or Flash 116 during different times of the day or based on different read or write patterns.

The storage administrator also may enable redundancy storage extension 138D based on storage profile 130. For example, transaction client 102 may perform real-time transactions with customers and cannot lose transaction data or shut down due to a system failure. Resource node 100 may need to implement a redundancy scheme, such as RAID6, that recovers data after disk, software, or network failure. Storage extension 136D enables resource node 100 to implement a redundancy scheme for storage operations for client 102.

The storage administrator may control data distribution using storage extension 136E. For example, client 102 may want to access data quickly from local solid state media 114 and 116 and local disks 118. Enabling storage extension 136E enables resource node 100 to store data on local disks 118. Disabling storage extension 136E enables resource node 100 to store at least some data on remote disks 120. For example, disabling storage extension 136E may enable resource node 100 to store data on remote disks 120.

Dock configuration 110 also may include performance extensions, such as a quality of service storage extension 136F. The storage administrator may specify a particular storage latency, such as 2 milliseconds (ms). Resource node 100 then utilizes different elements in storage media 112 for providing the 2 ms storage access latency.

Figure 3:
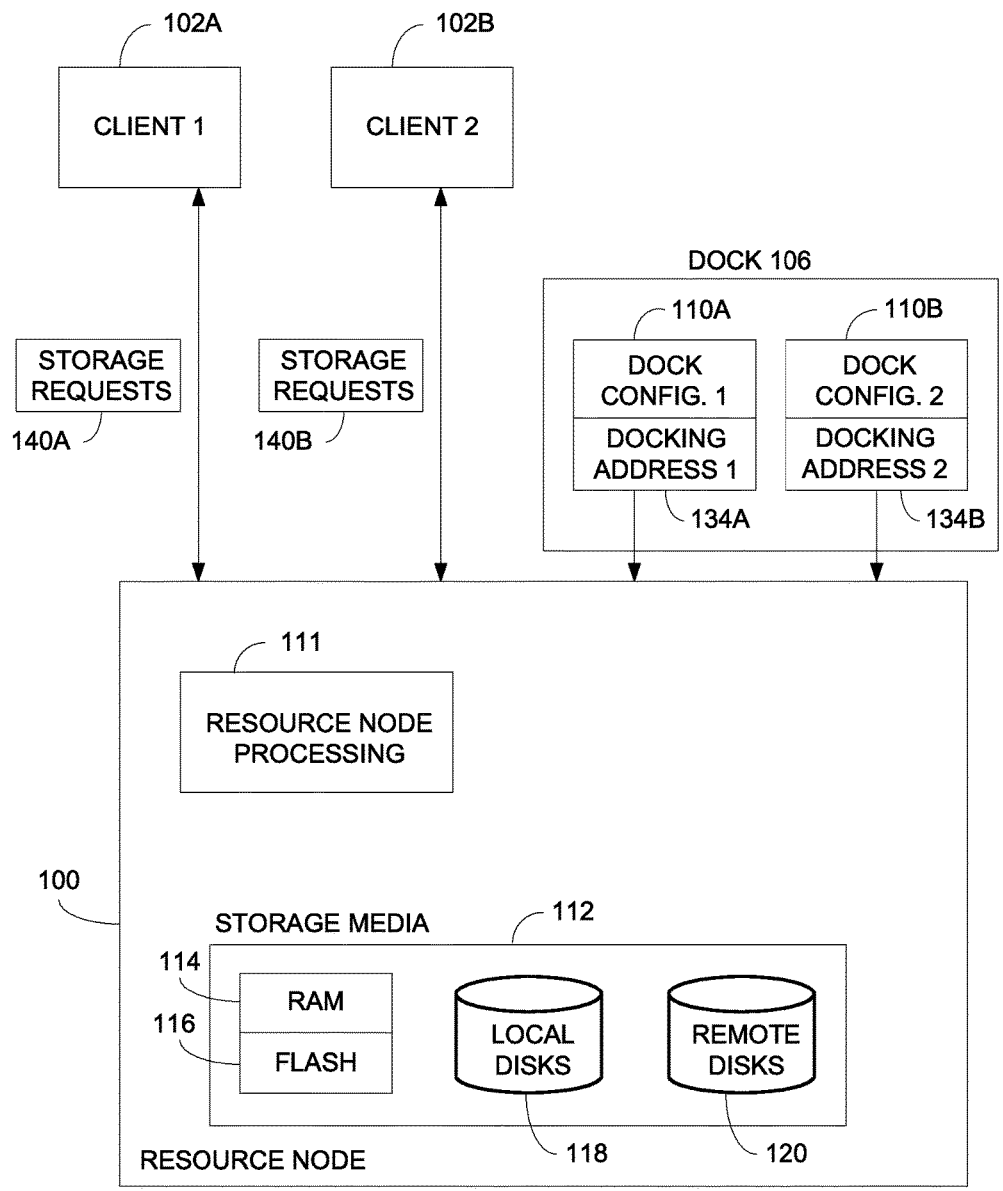
FIG. 3 depicts an example resource node with multiple dock configurations.

FIG. 3 shows different dock configurations 110 configured for different clients 102. Two different clients 102A and 102B may connect to access node 100. Client 102A and client 102B may have different storage profiles. For example, client 102A may perform transactional storage operations as described above in FIG. 2. Client 102B may perform analytics that primarily read large sequential blocks of data.

The storage administrator may create a first dock configuration 110A for client 102A and create a second dock configuration 110B for client 102B. Dock configuration 110A may include storage extensions 136A-136F described above in FIG. 2. Dock configuration 110B may include a different set of storage extensions adapted to the transactional storage operations associated with client 102B.

Dock configurations 110A and 110B may have associated docking address 134A and 134B, respectively. Alternatively, dock configurations 110A and 110B may have port identifiers or disk identifiers. Client 102A may use docking address 134A to access resource node 100 and client 134B use docking address 134B to access resource node 100. Resource node processing 111 associates docking address 134A with dock configuration 110A, and generates storage instructions for implementing the storage extensions enabled in dock configuration 110A. Resource node processing 111 associates docking address 134B with dock configuration 110B and generates storage operations for implementing the storage extensions enabled in dock configuration 110B.

For example, storage request 140A may comprise a read operation. Resource node 100 identifies an IP address, port, and/or disk number in storage request 140A associated with docking address 134A for dock configuration 110A. Resource node 100 generates a set of storage operations based on dock configuration 110A for executing the read operation in storage request 140A. For example, resource node 100 may cache data in RAM 114 and Flash 116, use local disks 118, provide redundancy, etc. to implement the storage extensions for dock configuration 110A.

Storage request 140B also may comprise a read operation to the same data. Resource node 100 identifies an IP address, port, and/or disk number in storage request 140B associated with docking address 134B in dock configuration 110B. Resource node 100 generates a different set of storage operations based on dock configuration 110B for executing the read operation in storage request 140A. For example, resource node 100 may not cache data in RAM 114 or Flash 116 but may perform a read ahead operation to implement the different set of storage extensions identified in dock configuration 110B.

In another example, storage request 140A may comprise a write operation. Resource node processing 111 may cache the data in request 140A in RAM 116 and/or Flash 116. Resource node processing 111 also may perform a RAID6 redundancy operation that stripes write data in storage request 140A over multiple different local disks 118.

Client 102B may write data storage request 140B. Dock configuration 110B may disable a cache and tiering. Accordingly, resource node processing 111 may not cache the data associated with storage requests 140B in RAM 114 nor tier the data in Flash 116. Thus, resource node 100 changes storage operations used for accessing storage media 112 based on the storage extensions identified in dock configurations 110A and 110B.

Figure 4:
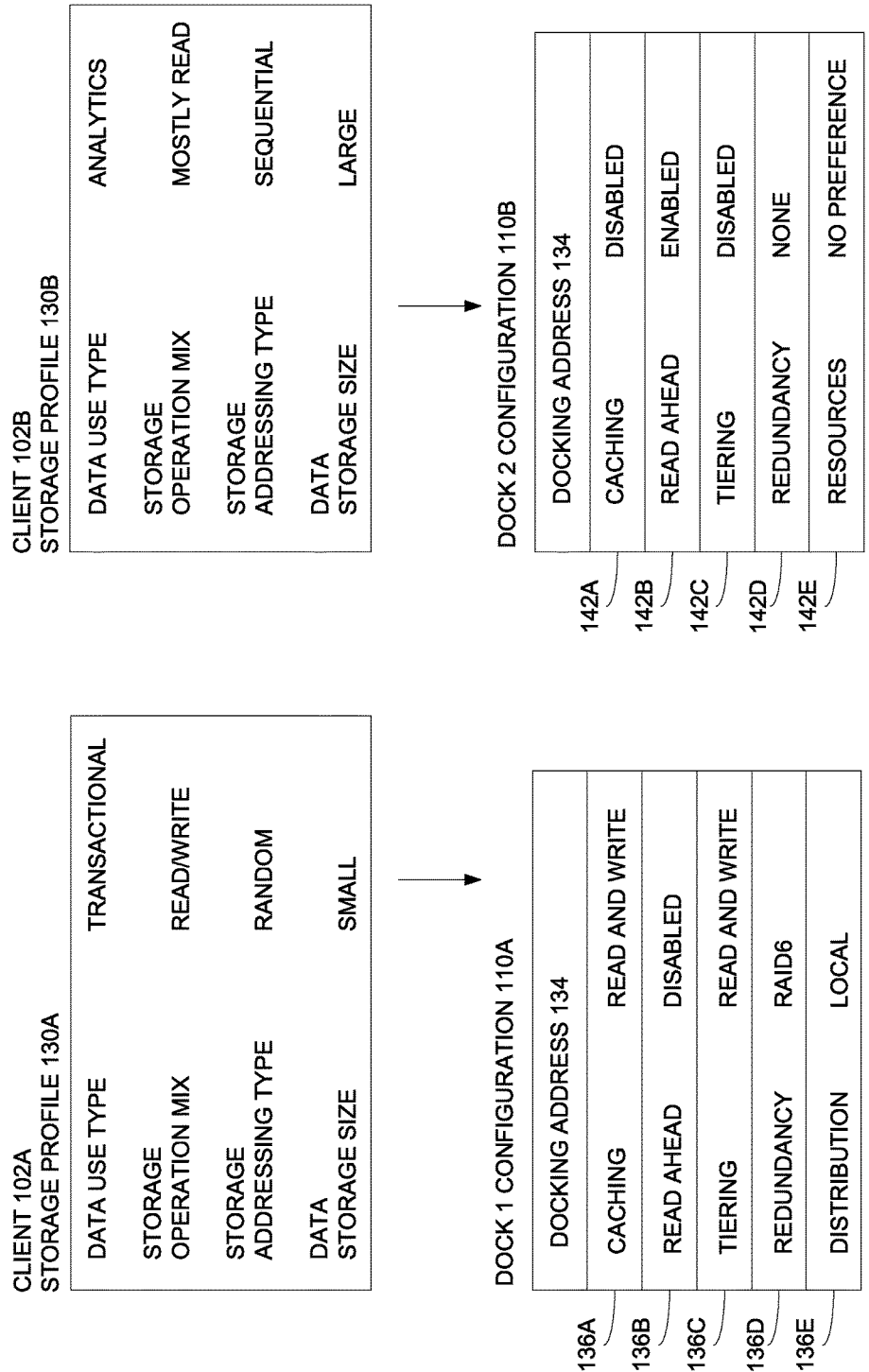
FIG. 4 depicts the configuration profiles of FIG. 3 in more detail.

FIG. 4 shows dock configurations 110A and 110B in more detail. Client 102A has the same storage profile and dock configuration 110A described above in FIG. 2. Client 102B has a storage profile 130B for analytic applications. For example, client 102B may comprise an accounting application that generates reports from the transactions generated by client 102A.

As mentioned above, analytics clients may mostly perform read operations. Analytic operations may read relatively large sequential blocks of data. Analytics clients may not need data redundancy, since analytics data can be recreated from previously stored data in storage media 112. Analytics clients also may not need the same performance as transaction clients and therefore may not need the fastest storage access.

The storage administrator generates dock configuration 110B for storage profile 130B. Since storage performance is not as critical, the storage administrator may disable caching extension 142A and tiering extension 142C. However, the storage administrator may enable read ahead extension 142B to improve read performance for large data block reads. The storage administrator may disable redundancy extension 142D since analytic data can be recreated from previously stored transaction date. The storage administrator selects a no-preference option for resource extension 142E to enable storage on lower performance remote disks 120.

Figure 5:
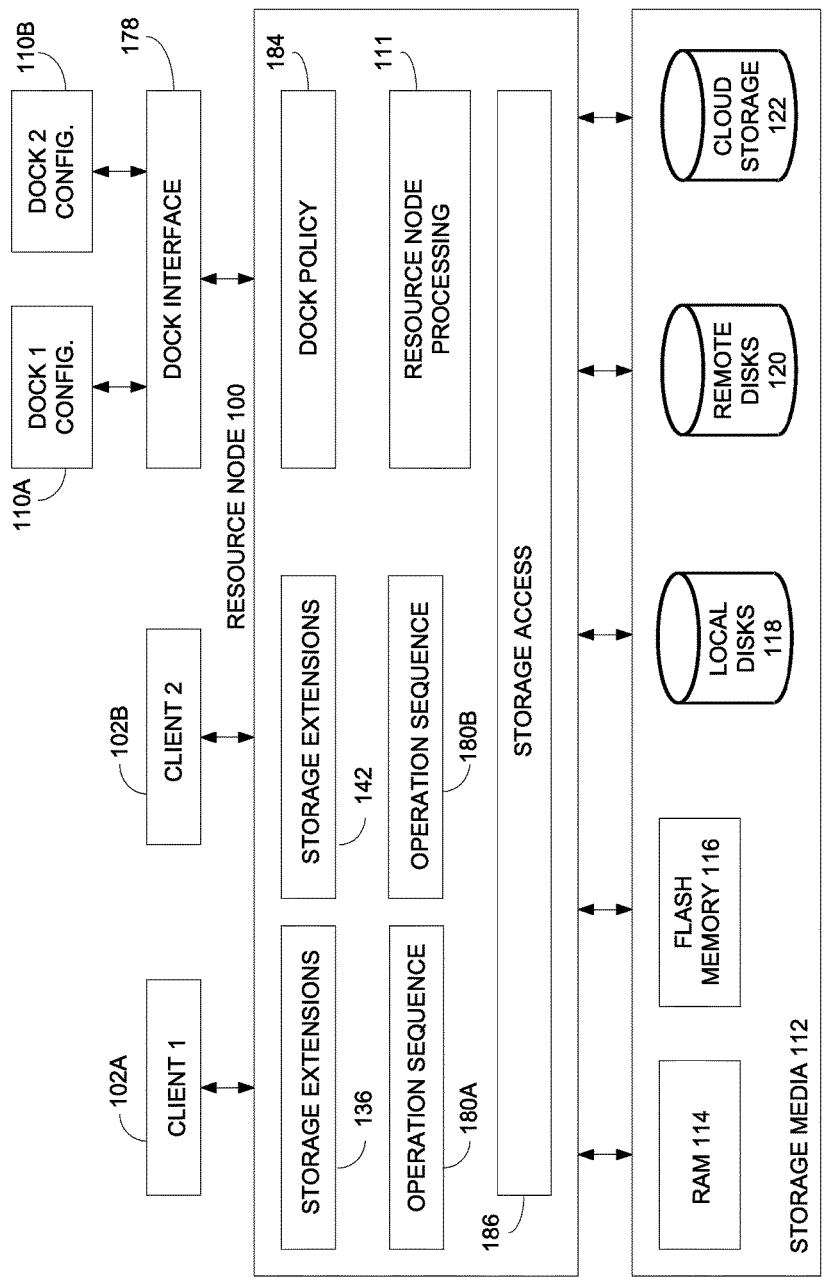
FIG. 5 depicts an example of a resource node that uses different storage extensions to different clients.

FIG. 5 shows an example of how resource node 100 uses dock configurations 110A and 110B. The storage administrator docks resource node 100 by loading dock configuration 110A and dock configuration 110B into resource node 100 via a dock interface 178. For example, the storage administrator may use a on a personal computer to create XML files that contain dock configurations 110A and 110B. The storage administrator then loads dock configurations 110A and 110B on resource node 100 via dock interface 178.

Resource node processing 111 conducts a dock policy 184 for docking clients 102, undocking clients 102, and performing storage operations based on storage extensions 136 and 142. The docking and undocking operations are described in more detail below. Resource node processing 111 generates an operation sequence 180A to implement storage extensions 136 associated with dock configuration 110A and generates an operation sequence 180B to implement storage extensions 142 associated with dock configuration 110B.

Operation sequence 180A is used for processing storage requests received from client 102A. For example, operation sequence 180A may cache or tier data from read and write operations in RAM 114 or Flash 116, provide redundancy for data writes, and use local disks 118 for storing data.

Operation sequence 180B is used for executing the storage requests received from client 102B. For example, operation sequence 180B may not cache and tier data, but may perform read aheads that read additional sequential blocks of data into RAM 114 and/or Flash 116. Operation sequence 180B also may selectively store data into remote disks 120 and/or cloud storage 122.

Storage access layer 186 includes any storage access protocols used for accessing RAM 114, Flash 116, local disks 118, remote disks 120, and cloud storage 122. For example, local storage, such as RAM 114, Flash 116, and local disks 118 may be accessed through a driver as "devices" or locally available disks. Local storage such as RAM 114 and Flash 116 may additionally be accessed as memory by configuring storage media 112 to appear in a processor memory map or as media accessible by a high-speed protocol such as NVMe or RDMA.

Remote disks 120 or other remote storage may be accessed by protocols supported by the remote storage system. Cloud storage 122 may be accessed using access methods provided by the cloud provider which may include the same protocols used to access remote disks 120.

Storage access layer 186 may dynamically add remote disks 120 and cloud storage 122 to resource node 100 based on storage extensions 136 and 142. As described above, storage extensions 142 may not care if data is stored in local disks 118, remote disks 120, or cloud storage 122. Storage access layer 186 may dynamically move data associated with client 102B into remote disks 120 and/or cloud storage 122 based on current capacities in storage media 112. Thus, resource node 100 may use different types of storage media 114, 116, 118, 120 and 122 on a per client bases.

Storage access layer 186 may conduct some generate storage operations for implementing storage extensions 136 and 142 on top of internal storage operations performed in storage media 112. For example, storage access layer 186 may conduct a redundancy operation based on storage extensions 136 that writes 1.5 blocks of data for every 1.0 block write operation received from client 102A. This may prevent data loss during a connection outage since the same data is recoverable from different physical disks.

Resource node 100 may not need to interact with the internal storage operations performed within storage media 112 underneath storage access layer 186. Resource node 100 may only need to access available storage 112 and know storage capacity and storage performance characteristics.

Figure 6:
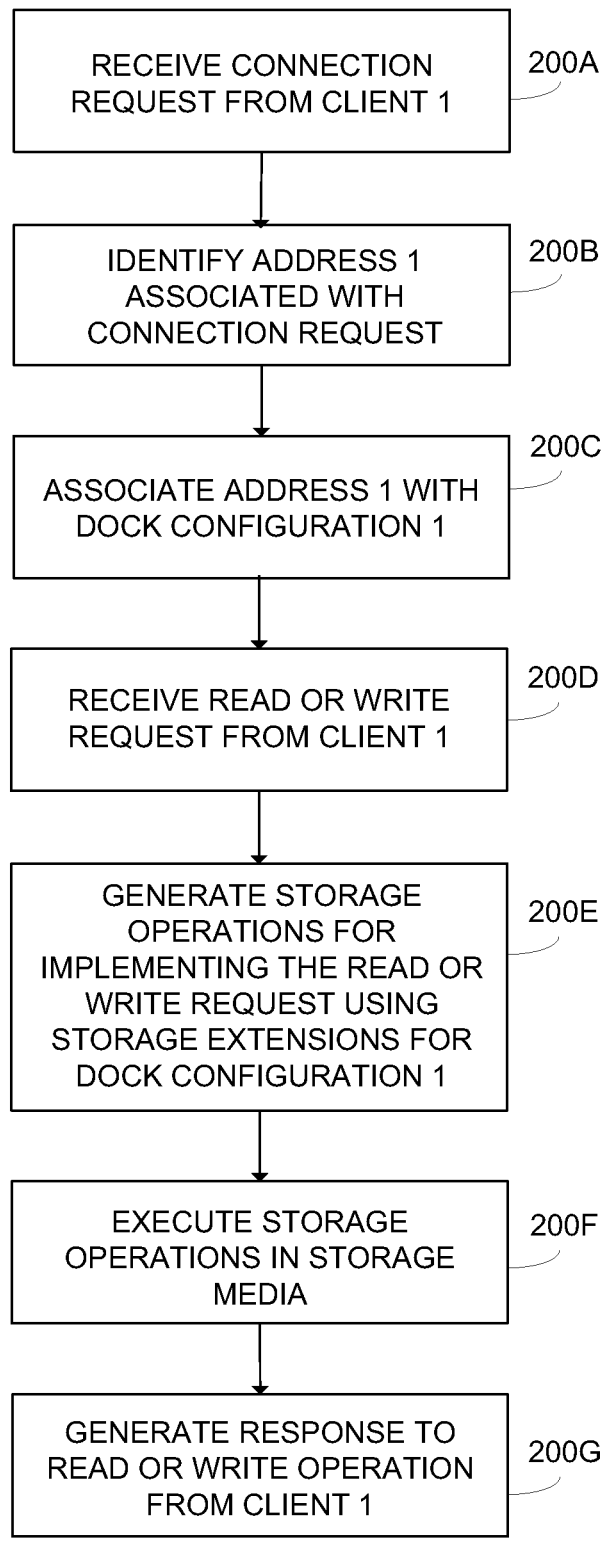
FIG. 6 depicts an example process for applying a first dock configuration to a first client.

FIG. 6 describes operations performed in the resource node 100. Referring to FIGS. 5 and 6, resource node 100 receives a connection request from client 102A in operation 200A. Resource node 100 identifies the address, port, or disk associated with the connection request in operation 200B. In operation 200C, resource node 100 identifies the address as associated with dock configuration 110A.

In operation 200D, resource node 100 receives a read or write request from client 102A. In operation 200E, resource node 100 generates an operation sequence 180A that executes the read or write operation in storage media 112. In operation 200F, resource node 100 executes the operation sequence in storage media 112. In operation 200G, resource node 100 provides results of the operation sequence to client 102A.

Figure 7:
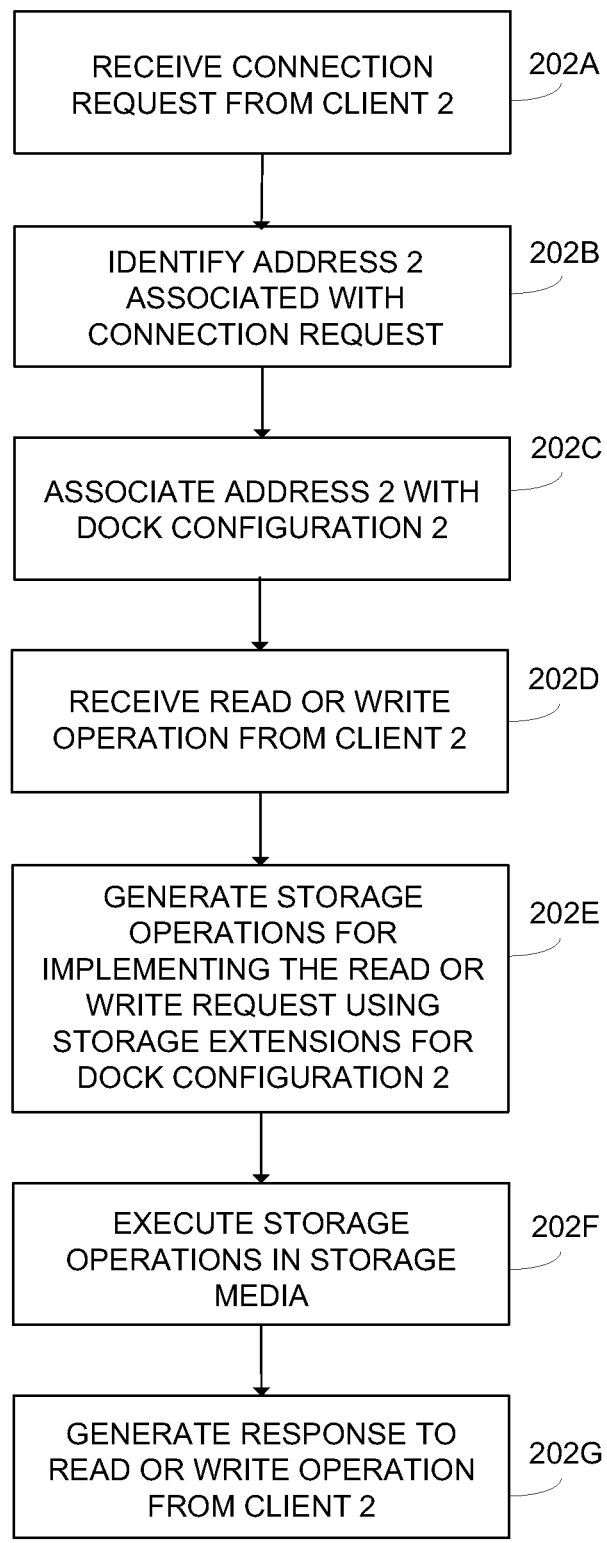
FIG. 7 depicts an example process for applying a second dock configuration to a second client.

Referring to FIGS. 5 and 7, resource node 100 receives a connection request from client 102B in operation 202A. Resource node 100 identifies the address associated with the connection request in operation 202B. In operation 202C, resource node 100 identifies the address as associated with dock configuration 110B.

In operation 202D, resource node 100 receives a read or write request from client 102B. In operation 202E, resource node 100 generates an operation sequence 180B that executes the read or write operation in storage media 112. In operation 202F, resource node 100 executes the operation sequence in storage media 112. In operation 202G, resource node 100 provides results of the operation sequence to client 102B.

Storage access layer 186 in FIG. 5 also has the ability to remap storage blocks to different storage devices in storage media 112 based on dock configurations 110. Local disk 118 may be 100 gigabytes. A conventional snapshot may look like another disk with 100 gigabytes of storage. Storage access layer 186 may dynamically set up a snapshot over multiple different local disks 118, remote disks 120, and/or cloud storage 122.

For example, storage access layer 186 may copy any data written by client 102A both to one of local disks 118 and cloud storage 122. Storage access layer 186 decides which elements in storage media 112 to store the duplicate writes based on dock configurations 110 and the storage performance impact to clients 102A and 102B.

Resource node processing 111 may dynamically update dock configurations 110 based on media usage. For example, dock configuration 110B may have an initial configuration as described above in FIG. 4 that enables a read ahead of 4 megabytes (MB). Resource node processing 111 may monitor the storage operations for clients 102B associated with dock configuration 110B and determine that most read operations are only for 1 megabyte blocks. Resource node processing 111 may dynamically update dock configuration 110B to perform one megabyte read aheads.

Conventional storage systems may monitor file usage, identify files that have not been accessed for long periods of time, and transfer the files to cloud storage 122. However, resource node 100 in FIG. 5 may perform cloud storage at a data access level. For example, resource node 100 may evaluate each block of data written by each client 102 based on the associated dock configuration 110. Resource node 100 may store the data into the most efficient location in local disks 118 or directly into cloud storage 122 based on the associated storage extensions 136 or 142.

In another example, a third client (not shown) may connect to resource node 100. The third client may include an analytics storage profile. In order to prevent the third client from adversely affecting the storage performance of transaction client 102A, Resource node processing 111 may connect the third client to analytic dock configuration 110B or create a second analytics dock configuration for the third client.

In yet another example, client 102B may need a snapshot of data for analysis. Current storage systems may create a synced clone that synchronizes writes by client 102A to both local disks 118 and remote disks 120. The synced clone is permanently configured and continues to fork write operations to both local disks 118 and remote disks 120.

Resource node 100 may configure a dock configuration 110B for 100% cloud storage that also disables caching, tiering, read ahead, and redundancy. Resource node 100 also may fork writes from client 102A to cloud storage 122. However, resource node 100 monitors clients on dock configuration 110B. When no more clients 102B are connected to dock configuration 110B, resource node 100 stops forking write data to cloud storage 122.

Resource node 100 may continue to write data from client 102A to local disks 118 based on dock configuration 110A. Storage access layer 186 notes that the address block range for the data in local disks 118 is out of sync with the snapshot in cloud storage 122. Client 102B may re-access dock configuration 110B and issue a read request for the snapshot on cloud storage 122. The snapshot in cloud storage 122 is now out of date with the data in local disks 118. Storage access layer 186 may read the synced portions of the snapshot in cloud storage 122 and then read and replace the unsynced portions of the snapshot in cloud storage 122 with the updated portions stored in local disks 118.

Resource node 100 generates storage sequences 180A and 180B for implementing customized storage extensions 136 and 142 for clients 102A and 102B, respectively. The customized storage extensions 136 and 142 allow resource node 100 to more efficiently access and utilize storage media 112.

Figure 8:
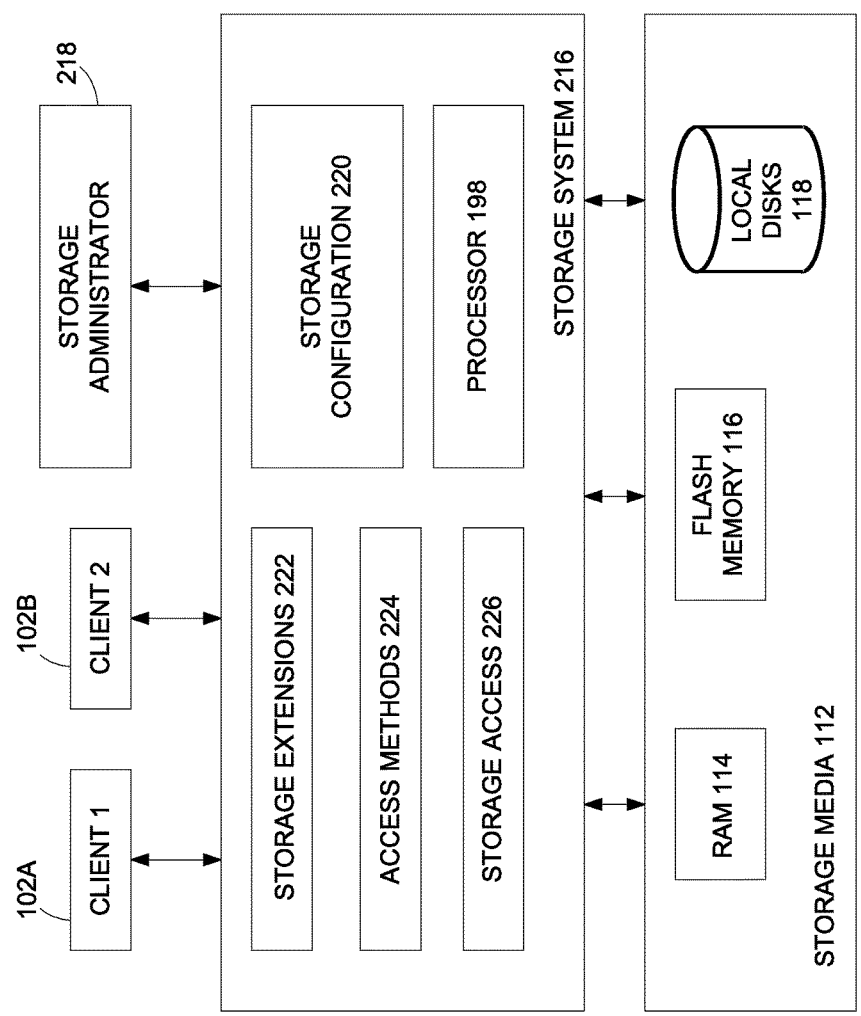
FIG. 8 depicts an example of a convention storage system.

FIG. 8 shows a conventional storage system 216. In FIG. 5 resource node 100 applies different storage extensions 136 and 142 to resource media 112 based on dock configurations 110A and 110B, respectively. In FIG. 8, the storage administrator 218 can only create a single storage configuration 220 in storage system 216. Accordingly, storage system 216 uses one set of storage extensions 222 and one set of associated access methods 224 for processing all storage requests from both client 102A and 102B.

Figure 9:
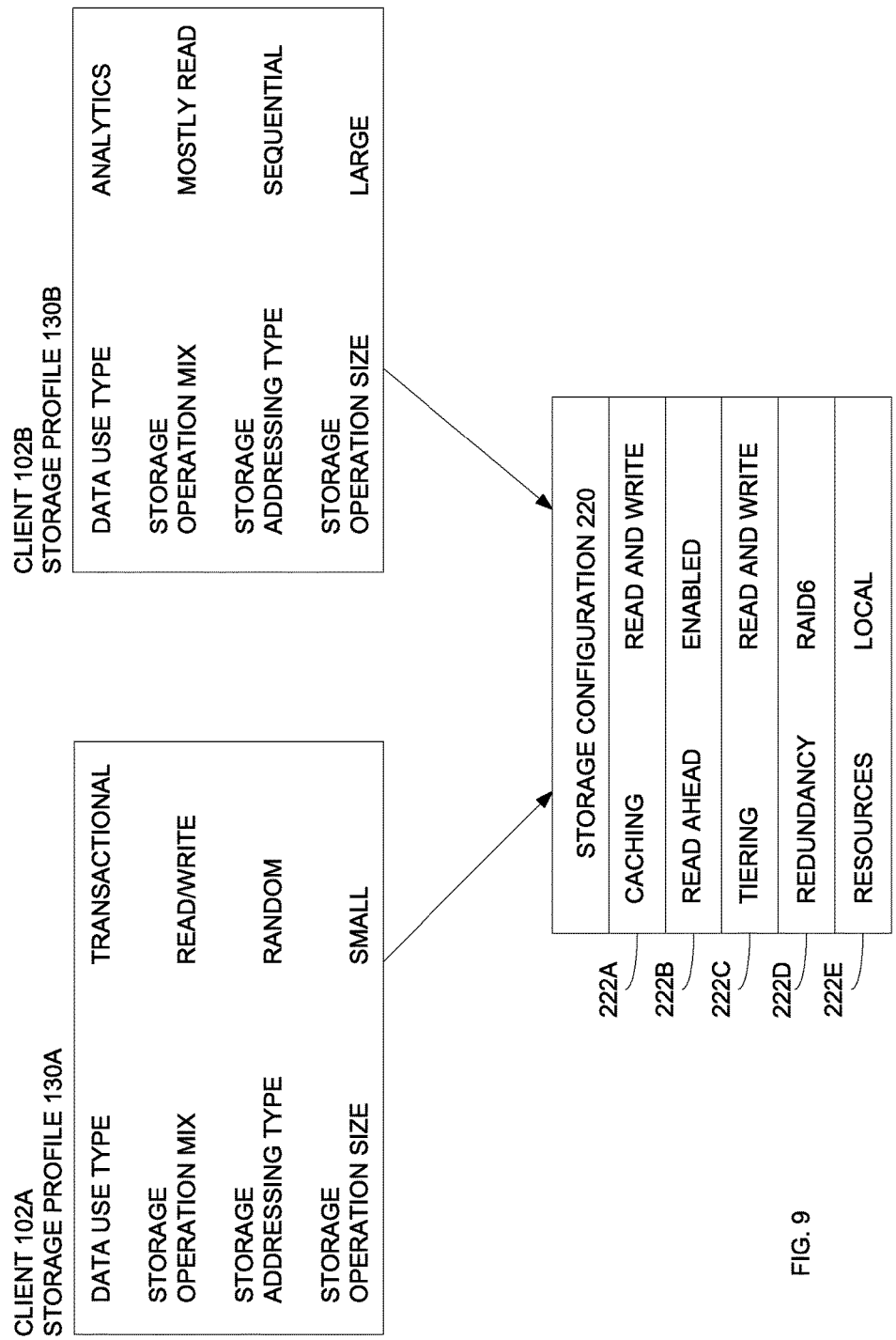
FIG. 9 depicts an example of a convention storage configuration for a conventional storage system.

Referring to FIGS. 8 and 9, clients 102A and 102B may have different storage profiles 130A and 130B, respectively, as described above in FIG. 4. Storage administrator 218 may enable all extensions 220A-220E attempting to optimize storage performance for both clients 102A and 102B. However, the different storage profiles for clients 102A and 102B may negate some storage performance provided by extensions 222.

As explained above, client 102B typically performs large sequential block reads that do not require caching or tiering. However, due to storage configuration 220, storage system 216 caches and tiers all read and write operations for both client 102A and client 102B. The large blocks of data read by client 102B may flush data previously cached or tiered in RAM 114 and Flash 116 for client 102A. Thus, the read ahead extension enabled for client 102B may reduce caching and tiering performance for client 102A, even though client 102B does not need caching or tiering.

Storage configuration 220 creates other problems. For example, client 102A may perform a read modify writes on 4 thousand byte (4 k) blocks. Read access patterns for client 102A are generally random and do not read sequential 4K data blocks. However, storage configuration 220 enables the read ahead extension 222B to improve storage performance for client 102B. Storage system 216 unnecessarily reads sequential 4K data blocks for read operations requested by client 102A reducing the overall read performance of storage media 112.

Storage configuration 220 may use RAID6 to store redundant backup copies of all data in storage media 112. The redundancy enabled by storage extension 222D reduces the overall storage capacity of storage media 112, even though client 102B does not need data redundancy. Storage extension 222E also causes storage system 216 to store data from both client 102A and client 102B in local disks 118. However, client 102B does not care if data is stored in local disks 118 or in remote disks 120 or cloud storage 122. Thus, storage system 216 reduces available storage capacity in storage media 112 by restricting data storage to local disks 118.

In other example, conventional storage system 216 in FIG. 8 may currently be using RAID5 redundancy. The storage administrator may want to change the storage system to RAID6. Storage administrator 218 would need to disconnect all clients 102 from storage system 216 and copy all of the currently stored data onto a different storage system, reconfigure storage system 216 for RAID6, and then rewrite the data back onto the reconfigured RAID6 storage system.

Resource node 100 in FIG. 5 may have a dock configuration 110 that currently specifies RAID5. The storage administrator may change the dock configuration from RAID5 to RAID6. Resource node 100 then starts to write any new data for the docked clients using RAID6. The resource node may internally spread the data over other resource nodes using RAID6 and create an internal mapping between the client storage operations and devices in storage media 112.

Dock configurations 110A and 110B in FIG. 5 enable resource node 100 to customize execution of storage extensions 136 and 142 and associated storage access operations 180A and 180B, respectively, for different client storage profiles. This not only increases overall performance and storage capacity for storage media 112 but also prevents storage operations for clients using a first storage profile from impairing storage performance and storage capacity for clients using a second storage profile.

Figure 10:
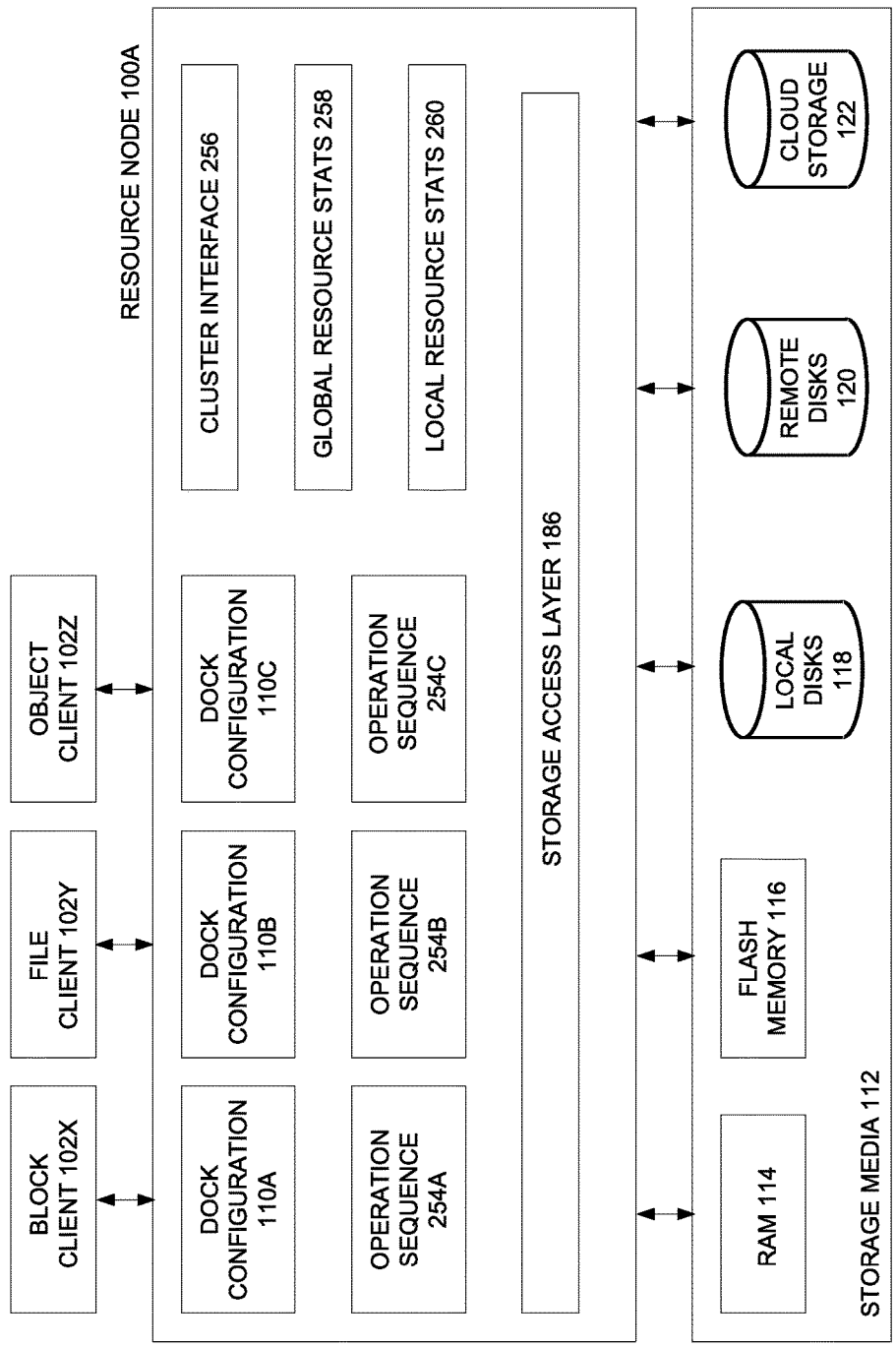
FIG. 10 depicts an example resource node that processes different block, file, and object storage requests.

FIG. 10 shows different types of clients connected to resource node 110A. Any variety of block clients 102X, file clients 102Y, and/or object clients 102z may connect to resource node 100. Resource node 100 may process block level read and write operations received from the block clients 102X, file level read and write operations receive from file clients 102Y, or object level read and write operations received from object clients 102Z.

Figure 11:
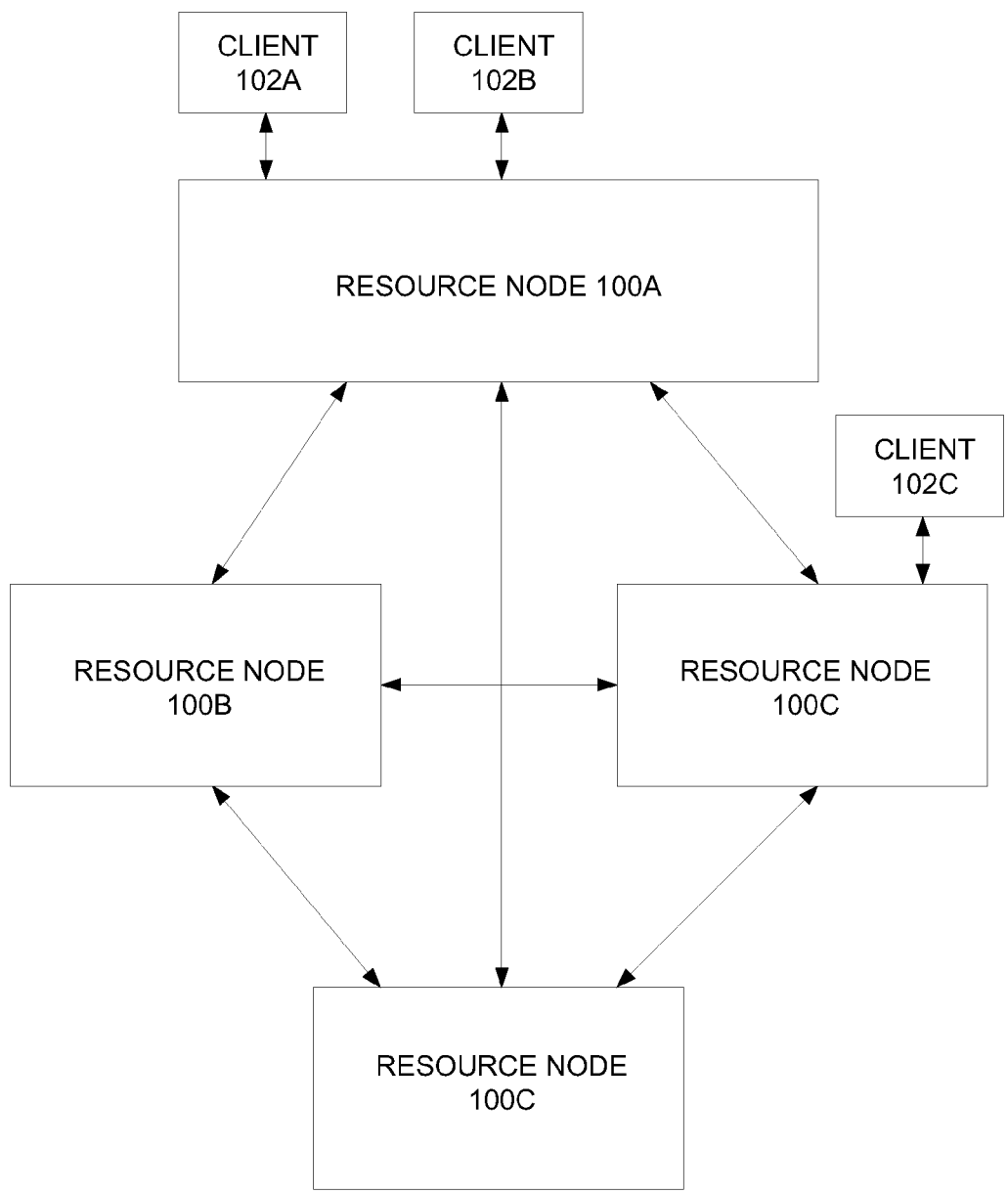
FIG. 11 depicts an example cluster of resource nodes.

Resource node 100A may include a cluster interface 256 for communicating with other resource nodes 100B-100D in FIG. 11. Global resource statistics 258 identify states in the other resource nodes 100B-100D. Local resource statistics 260 identify which clients 102 are docked to resource node 100A and which data blocks in storage media 112 are being used by clients 102.

Storage access layer 186 performs read and write operations in storage media 112 based on operation sequences 254A, 254B, or 254C, respectively. For example, a block, file, or object write request is received by resource node 100A and associated with one of dock configurations 110A-100C. Storage access layer 186 identifies an associated address block range for the block, file, or object write operation.

Storage access layer 186 uses local resource statistics 260 to determine if other local clients 102 are connected to dock configuration 110 and associated with the same block address range. Storage access layer 186 also may access global resource states 258 to determine if clients on other resource nodes are currently accessing the same block address range. Storage access layer 186 then generates a storage sequence for executing the write request based on the associated dock configuration 110, local resource statistics 260, and global resource statistics 258.

For example, a first client may be associated with a dock configuration 100A that requires all data blocks be written into local disks 118. A second client 102 on the same or a different resource node 100 may perform a read-modify-write the same data block. The second client may be associated with a second dock configuration 110 that does not require storage on local disks 118. Storage access layer 186 may store the modified data block in local disks 118 to conform with the dock configuration for the first client 102.

FIG. 11 shows multiple resource nodes 100A-100D connected together via cluster interface 256 in FIG. 10. In one example, two different clients 102A and 102C may connect to resource nodes 100A and 100C, respectively. Some of resource nodes 100 may all be located in a same storage server and other resource nodes 100 may be located on different storage servers.

Referring to FIGS. 10 and 11, clients 102A and 102C may access the same data in the same storage media 112 on resource node 100A. Resource nodes 100A and 100C are notified via global resource statistics 258. Each resource node 100A and 100C may perform storage operations in storage media 112 based on the dock configurations 110 associated with clients 102A and 102C, respectively.

In another example, a dock configuration in resource node 100A may dictate writing data to Flash. Resource node 100A receives write data from client 102A. Resource node 100A does not have local Flash available for storing write data from client 102A.

Resource node 100A communicates with resource node 102C via cluster interface 256 and determines resource node 100C has available Flash. Resource node 100A sends the write data to resource node 100C and updates global resource statistics 258 to indicate resource node 100C contains the write data for client 102A. Client 102A may have no knowledge that resource node 100A stored the data in Flash memory in resource node 100C.

Figure 12:
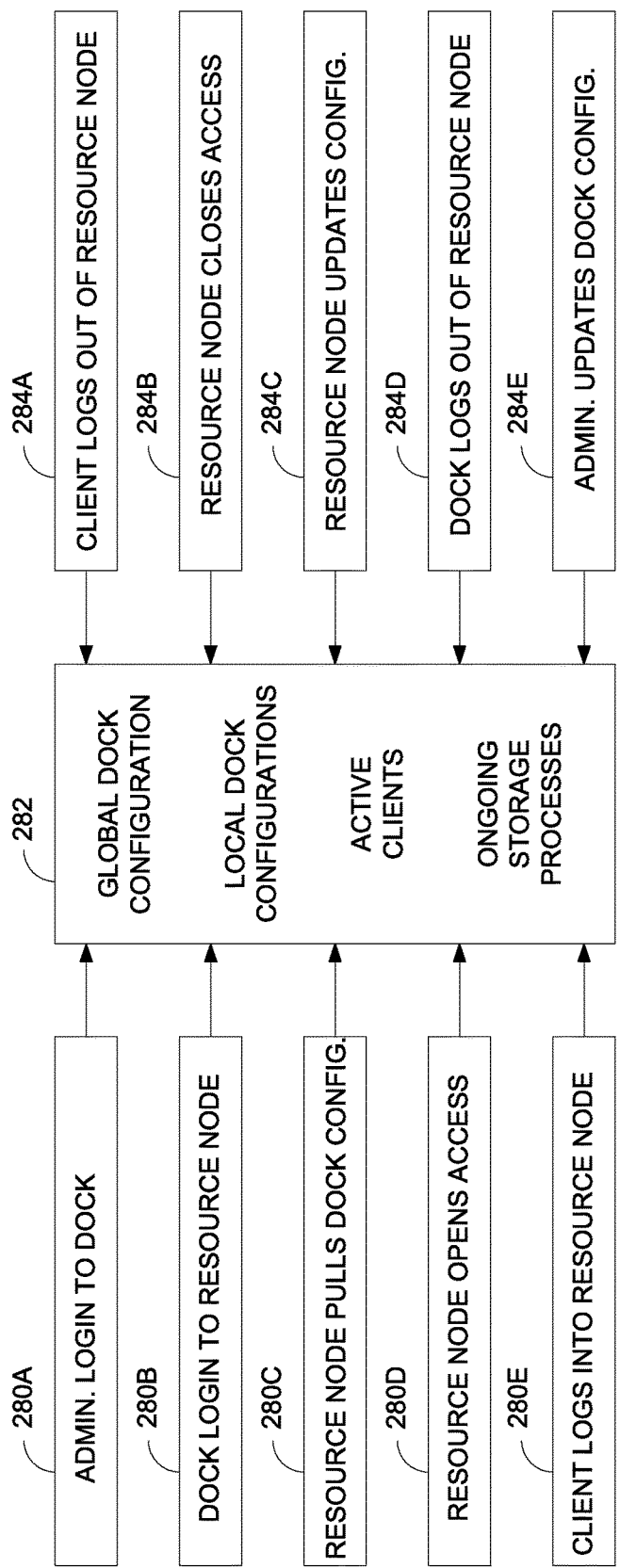
FIG. 12 depicts an example process docking and undocking a resource node.

FIG. 12 shows operations for docking and undocking the resource node. The client may not initially have access to the resource node. In operation 280A, the storage administrator logs into the dock and in operation 280B the dock logs into the resource node.

In operation 280C, the resource node pulls in the dock configuration by loading all of the states and conditions for the dock configuration. For example, the dock configuration may allow ISCSI access. The resource node pulls the dock configuration in operation 280C and opens TCP ports to enable ISCSI connections in operation 280D. In operation 280E, a client logs into the TCP ports and starts issuing ISCSI commands. If the dock configuration was configured for fiber channel access, the resource node would pull in the dock configuration in operation 280C and attach to an ISCIS target within a fiber channel driver in operation 280D.

The client may connect to the resource node without docking to the resource node. However, the dock configuration still may dictate how the storage media in the resource node operates with respect to the client.

In operation 284A, the client undocks from the resource node. For example, the client terminates the TCP connection with the resource node. In operation 284B, the resource node closes access to the dock by deregistering the TCP ports or ISCSI drivers.

In operation 284C, the resource node updates the dock configuration. For example, the resource node may perform two checks needed before undocking. The first check determines if other dock configurations are associated with the storage media. The second check determines if any clients are attached to those docks.

In operation 284D, the dock logs out of the resource node effectively indicating that the resource node is available for a new dock configuration. In operation 284E the storage administrator updates the global dock configuration identifying the resource node as undocked.

Several resource parameters 282 are monitored and maintained before and after the resource node is docked. For example, the resource node monitors a global dock configuration that identifies how other resource nodes are docked and what clients are docked to those resource nodes. The global dock configurations allow the resource nodes to notify each other when different clients are accessing the same data.

The resource node also tracks local dock configurations and also tracks which clients are currently connected to the docks. Resource node also tracks ongoing storage processes performed by the different clients.

Figure 13:
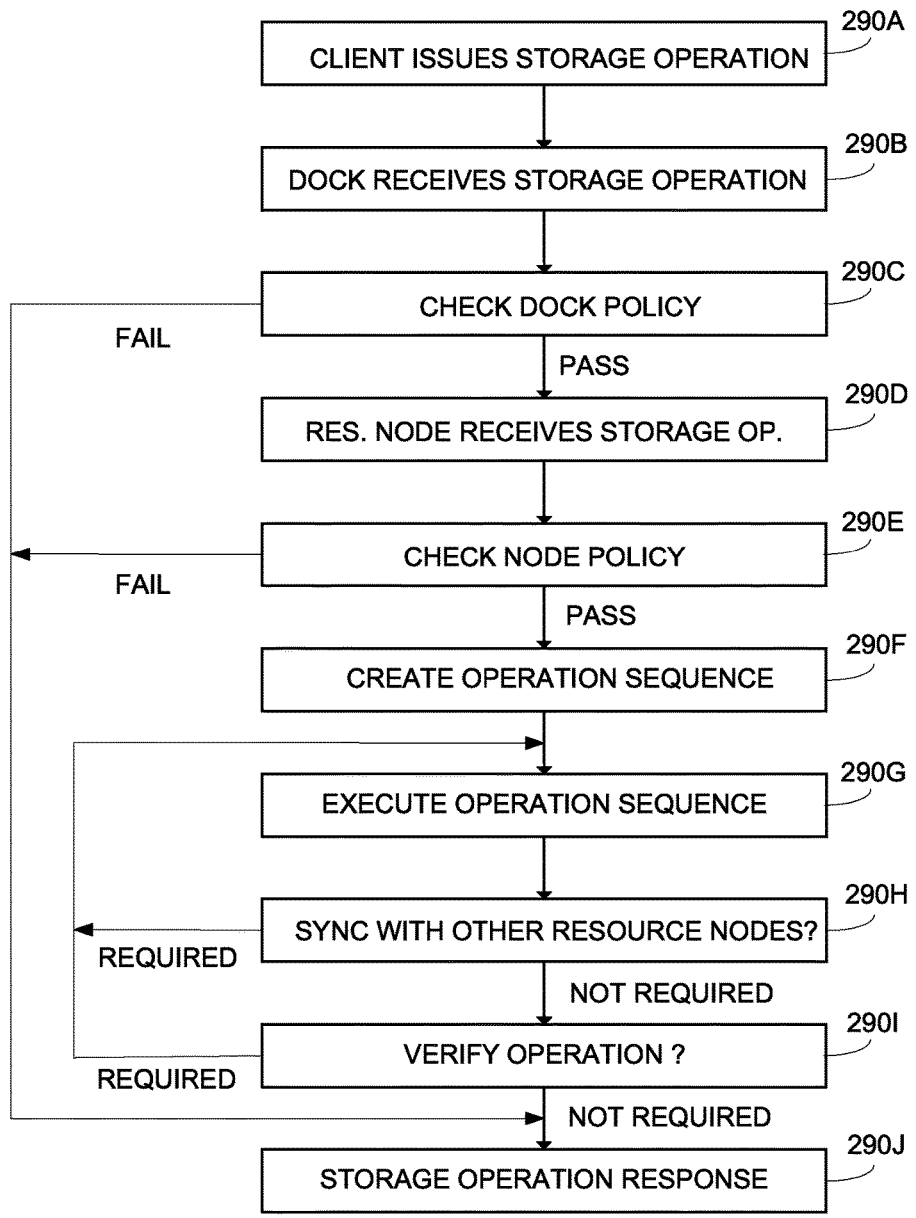
FIG. 13 depicts an example process for executing storage operations in a resource node.

FIG. 13 shows an example storage operation after docking the resource node. The resource node may institute a dock policy that defines how the storage media is presented to clients. The resource node also may operate a node policy associated with the physical state of the storage media.

Dock policies and node polices may be performed together or may be interchangeable but are described as separate policies below for explanation purposes. In the examples below, some of the dock policies may alternatively be performed as node policies and some of the node policies may alternatively be performed as dock policies.

In operation 290A, a client issues a storage operation. In operation 290B, the resource node receives the storage operation. In operation 290C, the resource node determines if the storage operation conforms with the dock policy. For example, the dock policy only may allow read operations and may fail any write operations received from the client.

Other examples of dock policies may include, but are not limited to, specifying block size limits, times of day for performing different types of storage operations, and/or require redundancy that strips data across multiple address blocks.

If the storage operation passes the dock policy, the resource node in operation 290D determines if the storage operation conforms with the node policy. Otherwise the storage operation is terminated in operation 290J. The node policy may determine if an address in the storage operation exists on a logical unit number (LUN). In another example, the resource node may stripe data across 4 different resource nodes. In operation 290E, the node policy may fail the storage operation if one of the resource nodes is down. In yet another example, the node policy may fail storage write operations that would overflow the storage media.

Operation 290F creates an operation sequence when the storage operation passes the node policy. The operation sequence may comprise a set of instructions that implements the storage extensions associated with the dock configuration. For example, the dock configuration associated with the client may require storing write data in Flash. The node policy may determine the resource node is short on Flash memory and may identify another resource node with a large amount of available Flash.

The operation sequence is executed in operation 290G and performs the steps necessary for storing the write data in Flash on the other resource node. For example, when the resource node needs to strip data over 4 different resource nodes, the operation sequence performs write operations over the 4 different resource nodes. In another example, the dock configuration may identify a performance level, such as using Flash memory for caching 80 percent of read operations. The operation sequence caches the read operations based on the caching level identified in the dock configuration.

If the storage operation uses other resource nodes, synchronization with the other resource node is verified in operation 290H. For example, operation 290H notifies other resource nodes of local storage operations and may confirm another resource node is available for storing write data into Flash memory.

Operation 290I confirms successful completion of the operation sequence. For example, the resource node may not need to verify successful completion of the operation sequence, may need to verify successful completion only with local storage media, or may need to verify successful completion of some portion of the operation sequence on other remote resource nodes. In operation 290J, the resource node responds to the client confirming completion of the storage operation and/or provides data associated with the storage operation.

The resource node configures storage systems for different capacity, performance, and/or bandwidth. When processing storage operations, the resource node takes into account the dock configuration loaded in the resource node, the docks configured on other resource nodes, and the clients currently docked to the resource nodes. The resource node then uses any local and/or remote storage media for executing the storage operation.

Digital Processors, Software and Memory Nomenclature

The processing and/or computing devices described in this application, including both virtual and/or physical devices, include a storage media configured to hold remote client data and include an interface configured to accept remote client storage commands.

As explained above, embodiments of this disclosure may be implemented in a digital computing system, for example a CPU or similar processor. More specifically, the term "digital computing system," can mean any system that includes at least one digital processor and associated memory, wherein the digital processor can execute instructions or "code" stored in that memory. (The memory may store data as well.)

A digital processor includes but is not limited to a microprocessor, multi-core processor, Digital Signal Processor (DSP), Graphics Processing Unit (GPU), processor array, network processor, etc. A digital processor (or many of them) may be embedded into an integrated circuit. In other arrangements, one or more processors may be deployed on a circuit board (motherboard, daughter board, rack blade, etc.). Embodiments of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example Random Access Memory (RAM) or FLASH memory embedded in an integrated circuit Central Processing Unit (CPU), network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, some embodiments may be implemented or embodied in computer software (also known as a "computer program" or "code"; we use these terms interchangeably). Programs, or code, are most useful when stored in a digital memory that can be read by one or more digital processors. The term "computer-readable storage medium" (or alternatively, "machine-readable storage medium") includes all of the foregoing types of memory, as well as new technologies that may arise in the future, as long as they are capable of storing digital information in the nature of a computer program or other data, at least temporarily, in such a manner that the stored information can be "read" by an appropriate digital processor. The term "computer-readable" is not intended to limit the phrase to the historical usage of "computer" to imply a complete mainframe, mini-computer, desktop or even laptop computer. Rather, the term refers to a storage medium readable by a digital processor or any digital computing system as broadly defined above. Such media may be any available media that is locally and/or remotely accessible by a computer or processor, and it includes both volatile and non-volatile media, removable and non-removable media, embedded or discrete.

Having described and illustrated a particular example system, it should be apparent that other systems may be modified in arrangement and detail without departing from the principles described above. Claim is made to all modifications and variations coming within the spirit and scope of the following claims.

The invention claimed is:

1. A method, comprising:
   receiving, by a processing device in a resource node, one or more dock configurations identifying reconfigurable sets of storage extensions for the resource node;
   receiving, by the processing device, a storage request from a client, wherein the storage request transmits data to the resource node or receives data from the resource node;
   identifying, by the processing device, one of the dock configurations associated with the client;
   generating, by the processing device, storage operations for implementing the storage extensions for the identified one of the dock configurations;
   using, by the processing device, the storage operations for executing the storage requests;
   dynamically reconfiguring, by the processing device, the storage operations used for implementing the storage extensions in the resource node based, at least in part, on performance of the storage operations executing a plurality of storage requests for the identified one of the dock configurations;
   identifying, by the processing device, a client storage profile for the identified one of the dock configurations, the client storage profile identifying types of storage operations performed by the client; and
   varying, by the processing device, types of storage media devices used in processing the storage request based on the types of storage operations identified in the client storage profile.

2. The method of claim 1, further comprising:
   receiving, by the processing device, a second storage request from a second client;
   identifying, by the processing device, a second one of the dock configurations associated with the second client;
   generating, by the processing device, a second set of storage operations that implement storage extensions for the second one of the dock configurations; and
   using, by the processing device, the second set of storage operations for executing the second storage request.

3. The method of claim 1, further comprising:
   identify, by the processing device, a docking policy associated with the identified one of the dock configurations; and
   generating, by the processing device, the storage operations for executing the storage request based on the docking policy.

4. The method of claim 1, further comprising
   monitoring a storage latency as part of the performance of the storage operations in the resource node;
   comparing the storage latency with a quality of service (QOS) in the dock configuration associated with the client; and
   dynamically reconfiguring the storage operations based on the comparison between the storage latency and the QOS.

5. The method of claim 1, further comprising enabling, by the processing device, a tiering operation in the resource node based on the identified one of the dock configurations.

6. The method of claim 1, further comprising enabling, by the processing device, a read redundancy writing operation in the resource node based on the identified one of the dock configurations.

7. The method of claim 1, further comprising accessing, by the processing device, local storage and/or remote storage in the resource node based on the identified one of the dock configurations.

8. The method of claim 1, further comprising:
   identifying, by the processing device, a conflict implementing the storage extensions for the identified one of the dock configurations;
   identifying, by the processing device, a second resource node based on the conflict; and
   executing, by the processing device, the storage operations on the second resource node.

9. An apparatus, comprising:
   a storage media configured to hold remote client data;
   an interface configured to accept remote client storage commands to transmit data to the storage media or receive data from the storage media; and
   a processing device configured to:
   load a dock configuration into a resource node, the dock configuration identifying a set of dynamically reconfigurable storage extensions that determine how the resource node is configured for executing the client storage commands;
   process a storage request from a client associated with the remote client storage commands;
   identify the client as associated with the dock configuration;
   create an operation sequence of storage operations for implementing the set of storage extensions identified in the dock configuration;
   execute the operation sequence of storage operations for the storage request;
   dynamically reconfiguring the operation sequence of storage operations used for implementing the storage extensions for the dock configuration based, at least in part, on performance of the operation sequence of storage operations executing the client storage commands;
   identify a client storage profile for the dock configuration, the client storage profile identifying types of storage operations performed by the client; and
   vary types of the storage media used in processing the storage request based on the types of storage operations identified in the client storage profile.

10. The apparatus of claim 9, wherein the processing device is further configured to:
    identify a conflict between the storage request and the dock configuration;
    identify a second resource node based on the conflict; and
    execute the operation sequence on the second resource node.

11. The apparatus of claim 9, wherein the processing device is further configured to:
    identify an additional resource node associated with the storage request; and
    synchronize the operation sequence in both the resource node and the additional resource node.

12. The apparatus of claim 9, wherein the processing device is further configured to:

identify a first dock configuration and a second dock configuration;
receive a first storage request from a first client;
identify the first client as associated with the first dock configuration;
create a first operation sequence for the first storage request based on the first dock configuration;
execute the first operation sequence in the resource node;
receive a second storage request from a second client;
identify the second client as associated with the second dock configuration;
create a second operation sequence for the second storage operation based on the second dock configuration; and
execute the second operation sequence in the resource node.

13. The apparatus of claim 9 wherein the operation sequence uses caching and/or tiering for implementing the dock configuration.

14. The apparatus of claim 9 wherein the operation sequence uses data redundancy for implementing the dock configuration.

15. The apparatus of claim 9 wherein the operation sequence uses local and remote storage for implementing the dock configuration.

16. An apparatus, comprising:
storage media configured to hold remote client data;
an interface configured to accept remote client storage commands to transmit data to the storage media or receive data from the storage media; and
a computing system configured to:
load different storage configurations;
process storage requests from clients associated with the remote client storage commands;
identify the storage configurations associated with the clients;
generate different storage operation sequences for implementing the storage configurations associated with the clients;
execute the storage operation sequences; and
dynamically reconfiguring the storage operation sequences used for implementing the storage configurations associated with the clients based, at least in part, on performance of the storage operation sequences executing the client storage commands;
identify client storage profiles for the storage configurations, the client storage profiles identifying types of storage operations performed by the clients; and
vary types of the storage media used in processing the storage requests based on the types of storage operations identified in the client storage profiles.

17. The apparatus of claim 16, wherein the computing system is further configured to:
identify addresses, ports, or disks used in the storage requests;
associate the addresses, ports, or disks with the storage configurations; and
generate the different storage operation sequences based on the storage configurations associated with the addresses, ports, or disks.

18. The apparatus of claim 16, wherein the computing system is further configured to:
identify clients logged into ports;
identify the storage configurations associated with the ports; and
generate the storage operation sequences based on the identified storage configurations.

19. The apparatus of claim 16, wherein the computing system is further configured to:
instigate different dock policies for the different storage configurations; and
accept the storage requests and generate the storage operation sequences based on the dock policies for the storage configurations associated with the storage requests.

20. The apparatus of claim 16, wherein the computing system is further configured to:
create virtual data storage resources based on the storage configurations; and
access to the virtual data storage resources based on the storage configurations associated with the clients.

21. The apparatus of claim 16, wherein the computing system is further configured to implement storage extensions with the storage operation sequences based on the storage configurations associated with the clients.

* * * * *